United States Patent [19]
Poole et al.

[11] 3,785,674
[45] Jan. 15, 1974

[54] CRASH RESTRAINT NITROGEN GENERATING INFLATION SYSTEM

[75] Inventors: Donald R. Poole, Woodinville; Peter L. Stang, Bellevue; James E. Mars, Vashon, all of Wash.

[73] Assignee: Rocket Research Corporation, Redmond, Wash.

[22] Filed: June 14, 1971

[21] Appl. No.: 152,899

[52] U.S. Cl. ............... 280/150 AB, 23/281, 149/35
[51] Int. Cl. ........................................... B60r 21/10
[58] Field of Search ............... 280/150 AB; 149/35, 149/36; 23/281, 220, 184, 182; 60/39.47; 102/39

[56] References Cited
UNITED STATES PATENTS

| | | | |
|---|---|---|---|
| 3,692,495 | 9/1972 | Schneiter et al. | 23/281 |
| 3,450,414 | 6/1969 | Kobori | 280/150 AB |
| 3,515,518 | 6/1970 | Halstead et al. | 23/281 |
| 2,981,616 | 4/1961 | Boyer | 149/36 X |
| 2,940,830 | 6/1960 | Thornhill | 23/182 R |
| 2,779,281 | 1/1957 | Maurice et al. | 102/39 |
| 3,109,375 | 11/1963 | Rumbel et al. | 102/39 X |
| 3,122,462 | 2/1964 | Kaufman et al. | 149/19 |
| 3,320,882 | 5/1967 | Schulz | 149/35 |
| 3,532,358 | 10/1970 | Selwa et al. | 23/281 X |

Primary Examiner—Kenneth H. Betts
Assistant Examiner—David M. Mitchell
Attorney—John A. Graybeal et al.

[57] ABSTRACT

A crash restraint system for an automobile comprising an inflatable bag mounted forward of the automobile passenger seat. A bag inflating device comprising a cluster of gas generating units, each of which has a primary combustion chamber to produce the driving gas mixture, a secondary reaction chamber to react with some of the products of the gas mixture to remove them from the gas mixture, and a gas generating coolant chamber which generates additional gas by vaporization and produces a cooler gas mixture to inflate the bag.

In the combustion chamber is a composition made up of an azide (e.g. sodium azide) and an oxidizer (e.g. potassium perchlorate), which upon ignition produces free nitrogen and other combustion products, such as sodium oxide, free sodium and potassium chloride. In the secondary reaction chamber is a porous composition (e.g. copper oxide and carbon) that reacts with the free sodium and sodium oxide and permits the free nitrogen to pass through to the coolant chamber. The coolant chamber contains a liquid halocarbon (e.g. Freon) which atomizes and vaporizes with the nitrogen to form an inflating gas for the bag.

42 Claims, 5 Drawing Figures

PATENTED JAN 15 1974

DONALD R. POOLE
PETER L. STANG
JAMES E. MARS
INVENTORS.

BY
*Draybell, Colos Barnard*
ATTORNEYS

CRASH RESTRAINT NITROGEN GENERATING INFLATION SYSTEM

BACKGROUND OF THE INVENTION

1. Field of the Invention

This invention relates to a crash restraint system in which a bag is inflated to prevent a passenger in an automobile from being thrown violently against the steering wheel, dashboard or other automobile structure.

There is a pending U.S. Pat. application, Ser. No. 84,267, filed Oct. 27, 1970, now abandoned, entitled, "Crash Restraint Method and Apparatus," Randel L. Hoskins and Duane A. Williams, inventors, which patent application is assigned to the same assignee as is this application and is being refiled as a continuation-in-part application, concurrently with the present invention. The present invention was conceived in a cooperative research effort in conjunction with the subject matter of that pending patent application and it is intended that the present invention be complementary to that pending patent application and its continuation-in-part application. In that pending patent application there is a collapsed bag which is inflated to provide a protective barrier for the car occupant. The device to inflate the bag comprises a cluster of gas generating units, each of which comprises a combustion chamber adapted to contain a composition that provides a substantially uniform outflow of gases for a short sustained period (e.g. 20 to 30 milliseconds). The resultant combustion gases are discharged along a predetermined path out a nozzle and through a coolant (e.g. Freon) in a manner that the coolant is atomized into the stream of combustion gases to become vaporized therein and effect complete inflation of the bag.

2. Description of the Prior Art

There are in the prior art various devices which cause a protective bag to inflate in front of a driver or passenger to cushion him from impact with the steering wheel, dashboard or other vehicle structure. Usually the device is activated by an inertial switch responsive to a crash impact of the automobile. This inertial switch in turn causes an inflating device to quickly inflate the collapsed bag into its inflated position deployed in front of the driver or passenger. The inflating bag is generally supplied either from a source of compressed air or other compressed gas at 3,500 psi, for example, such as shown in U.S. Pat. No. 3,411,808; U.S. Pat. No. 3,413,031, and a number of other patents in the crash restraint field. However, not only does a compressed gas container add bulk to the system, but there is a safety consideraton in carrying highly compressed gas.

Hence, the disclosures of several prior art patents attempt to produce an inflating gas by igniting a composition such as black powder and using the combustion products for an inflating medium. For example, Kobori, U.S. Pat. No. 3,450,414, places a charge of black powder in a cartridge which in turn is disposed within a chamber of a liquid such as dichlorodifluoromethane (Freon 12), liquid propane, and solid ethyl alcohol or the like, and exploding the powder to vaporize the liquid. Selwa et al, U.S. Pat. No. 3,532,358, shows an inflating device for a crash restraint bag in which there are several pockets filled with black powder which are ignited sequentially to supply the inflating gas. Teague et al., U.S. Pat. No. 3,532,359, discloses a device similar to U.S. 3,532,358, in which several charges of black powder are ignited sequentially, and the combustion gases therefrom pass through a sublimable, vaporizable or decomposable material capable of absorbing heat, such as ammonium carbonate.

Outside of the crash restraint field there are other patents that show various gas generators in various applications. For example, Boyer, U.S. Pat. No. 2,981,616, discloses a gas producing composition comprising various azides, such as sodium azide, lithium azide, etc. and various oxidizing compounds, such as potassium perchlorate, potassium peroxide, etc. to produce a gaseous composition to pressurize liquid fuel in a rocket. Kaufman, U.S. Pat. No. 3,122,462, discloses a similar composition, consisting of an azide (sodium azide or potassium azide), a metal (aluminum, titanium, etc.) and an oxidizer (e.g. potassium permanganate, barium nitrate, etc.), but this composition is used as a pyrotechnic not for inflation. U.S. Pat. No. 2,980,103 discloses the use of a combustible powder to vaporize a liquid, such as ammonia, to activate a battery, for example. U.S. Pat. No. 3,558,785 shows a gas generator used as a propellant wherein there is a propellant charge of nitrocellulose and nitroglycerin which is ignited to produce a gas mixture which in turn is passed through a bed of charcoal. The water vapor in the gas mixture reacts to form CO and $H_2$. The resulting gas mixture then passes into a chamber containing ammonium carbonate to produce $CO_2$ and $NH_3$. Other patent disclosures in this field are Maxim, U.S. Pat. No. 931,135; Bottas, U.S. Pat. No. 3,421,860; Maurice et al. U.S. Pat. No. 2,779,281; Bender et al, U.S. Pat. No. 3,446,017; Kowalick et al, US. Pat. No. 3,305,319; and Halstead et al, U.S. Pat. No. 3,515,518.

However, the state of the art is deficient in a number of areas with regard to providing an effective crash restraint system where the inflating gas is provided at least partly by the products of a chemical reaction. First, for the bag to inflate and offer protection in a crash situation, the inflation must be very rapid, occurring in about 20 milliseconds. On the other hand, even though the inflation must be quite rapid, it must be a controlled inflation rather than an explosive discharge of gases into a bag. Not only would an explosive reaction very possibly cause the bag to impact a person with such force as to cause severe injury, but it also could rip the bag so as to destroy its cushioning effect. Further, if one of the passengers (e.g. a child) happens to be leaning against the dashboard when the bag inflates, an explosive expansion of the bag from the dashboard could throw the child back against the car seat with such violence as to risk injury.

Perhaps the most significant problem area lies in the stringent requirements for a crash restraint inflating system to be acceptable as a "man-rated" system. Since in many crash restraint systems the bag is vented to the interior of the car to prevent a severe rebound action of the bag (ie. hurling the passenger back against the seat after cushioning the impact), and since there is always a possibility that the bag will rip or puncture in the crash, the inflating gases themselves cannot be such as to cause harm to the automobile occupants. Ths immediately rules out a large number of gas generating compositions which would produce carbon monoxide as one of the combustion products, or other gas generating compositions that produce such toxic products as HCN, HCl, HF, $NO_2$, etc. Also, some of the prior art gas producing systems produce gas combustion products which are themselves too hot and would burn through the bag and/or burn the occupant adjacent the bag in the event the bag ruptures.

Also the prior art attempts to use a sublimable, vaporizable, or decomposing material to cool the combustion gases and to provide additional gas also produce problems with respect to a man-rated system. For example, the coolant itself must be non-flammable in view of the possibility of fire in a crash situation (which immediately rules out propane gas, alcohols, etc.) and it also must be non-scalding (which makes it quite problematical to use water as the vaporizing coolant). Compatability of another problem. For example, the use of a liquid halocarbon (such as Freon) as the vaporizing fluid, as suggested in the prior art, would very likely produce phosgene ($COCl_2$), which is deleterious in amounts as small as two parts per million, and possibly some other toxic products.

There is the further problem of "cardiac arrest." Some chemical compositions, when breathed in by a human being under normal circumstances, are not significantly dangerous. However, in a high stress situation (such as an automobile crash), these same chemical compositions, if inhaled, may cause a person's heart to stop beating for a sufficient time to cause death.

The three prior art patents cited above that utilize black powder for a gas producing inflating medium (U.S. Pat. No. 3,450,414; U.S. Pat. No. 3,532,358; and U.S. Pat. No. 3,532,359) involve several of these problem areas. First, the ballistics of black powder are such that the necessary controlled combustion would be difficult, if not impossible as a practical matter, to obtain with any real consistency. Also, certain decomposition products of black powder would be highly unacceptable (e.g. nitric oxide, certain sulfur compounds, and carbon monoxide). Further, the manner of discharging the combustion products of the black powder into Freon would almost certainly produce phosgene in deleterious amounts and other toxic products.

The two prior art patents which disclose a composition of sodium azide with other ingredients (U.S. Pat. No. 2,981,616 and U.S. Pat. No. 3,122,462), disclose the concept that such compositions do produce a nitrogen gas among the combustion products. However, these patents do not disclose how these compositions could be made properly applicable to a crash restraint system, nor do they teach how these compositions could or should be applied to a "man-rated" crash restraint system, while alleviating the problem areas indicated above.

SUMMARY OF THE INVENTION

The present invention resides in a crash restraint system which has both apparatus and composition features providing rapid and controlled inflation of a protective confinement (i.e. bag), and in a method of accomplishing this result. The inflating mechanism comprises at least one gas generating unit (and in the preferred embodiment a plurality of such units) which suppies the inflating gas in a rapid and controlled manner.

Each inflating unit comprises structure which defines a first primary combustion chamber or zone that contains a nitrogen producing composition, particularly a composition comprising essentially an azide (e.g. sodium azide) and a second ingredient to react therewith, preferably an oxidizer (e.g. potassium perchlorate). Upon combustion, this composition provides a sustained production of a gas mixture over a very short time period (e.e. 20 to 30 milliseconds). The combustion products comprise primarily free nitrogen gas, along with other combustion products (such as sodium oxide and metallic sodium).

Downstream of the primary combustion chamber is a secondary reaction chamber or zone containing a composition to react the undesirable constituents from the gas mixture and permit the nitrogen to pass through the secondary reaction chamber. The secondary chamber composition in the preferred embodiment comprises an acidic oxide (e.g. copper oxide, boric oxide, silicon oxide, or aluminum oxide) and in some instances a constituent such as activated charcoal to react with free sodium. Also mechanical filtering and condensing out the undesirable constituents is desirably accomplished in this secondary reaction chamber.

There is a third cooling and vaporizing chamber or zone downstream of the secondary reaction chamber. In the preferred embodiment this cooling chamber contains a cooling and vaporizing liquid, such as a liquid halocarbon (e.g. Freon). The gas from the secondary reaction chamber (predominantly nitrogen) passes into the coolant chamber so as to atomize and vaporize the liquid coolant. As disclosed in the above-mentioned pending U.S. Pat. application Ser. No. 84,267, in the preferred form the gases from the burning chamber are directed through a nozzle into the cooling chamber, so there is a progressive entrainment and vaporizing of the coolant into the gas stream at a location outside of the coolant chamber through the duration of the burning of the primary combustion chamber composition.

The gas producing composition is made up of an azide, which can be an alkali metal azide, an alkaline earth metal azide, or mixtures thereof. Preferably, sodium azide is used. The oxidizer can be a metal perchlorate, a metal chlorate, a chlorocarbon, a metal chloride, or mixtures thereof. It is less desirable, however, to use a carbon containing oxidizer along with an oxygen containing oxidizer, because of the possibility of generating an undersired amount of carbon monoxide as one of the combustion products. The preferred oxidizer is potassium perchlorate.

The preferred cooling material is a liquid halocarbon, and preferably perfluorocyclobutane ($C_4F_8$) or perfluorodimethylcyclobutane ($C_6F_{12}$). Either of these two compositions, when inhaled in gaseous form in concentrations typical for a crash restraint application are, to the best knowledge of the applicants herein, not harmful to human beings.

DESCRIPTION OF THE PREFERRED EMBODIMENTS

A clearer understanding of the present invention will be attained by first describing the total system and its operation, and then describing in more detail the individual components of this system.

A. Total System

Figure 1:
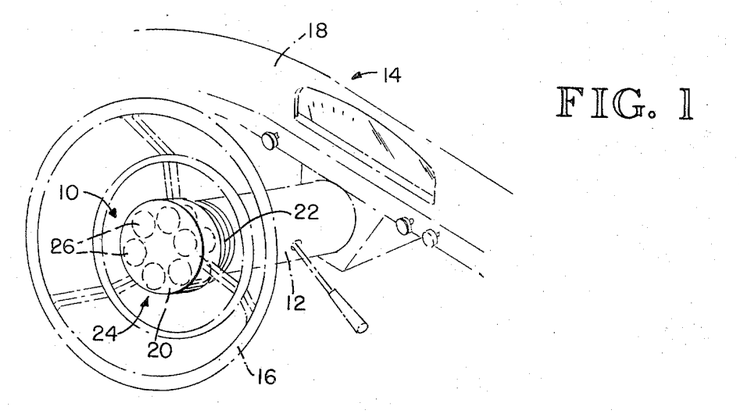
FIG. 1 is an isometric view of the system of the present invention with the bag in its collapsed position.

With reference to FIG. 1, the crash restraint apparatus 10 of the present invention is shown mounted on a steering column 12 of an automobile 14 having a steering wheel 16 and dashboard 18. The apparatus 10 comprises an inflatable bag 20 which in FIG. 1 is shown in its collapsed position, wherein the bag is suitably folded as in pleated condition (i.e. accordion fashion). The bag 20 is attached to a circular mounting structure 22 within which is housed a gas generating assembly 24 which communicates with the interior of the bag 20.

Figure 2:
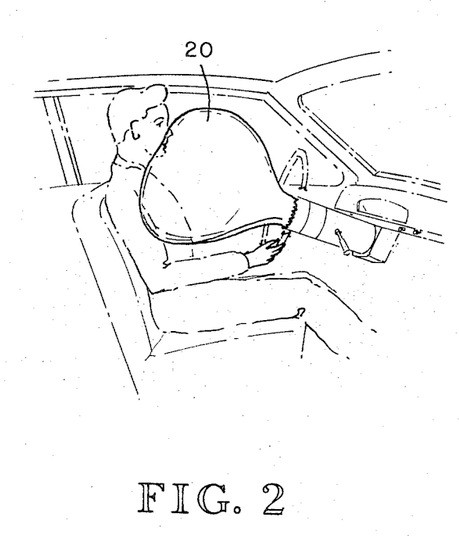
FIG. 2 is an isometric view of the system, with the bag in its inflated position.

The gas generating assembly 24 is made up of at least one and desirably a plurality or cluster of individual gas generating units 26. As shown herein, there are six such units 26 clustered in a hexagonal array at the head of the steering column 12. These units 26 are arranged to discharge their inflating gases in a rearward direction into the bag 20 to cause the bag 20 to expand in a rearward direction from the head of the steering column 12, as illustrated in FIG. 2, to provide a protective cushion.

Figure 3:
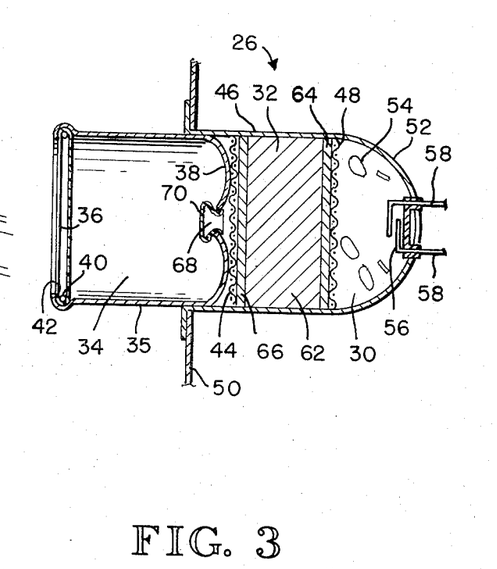
FIG. 3 is a longitudinal sectional view of one of the gas generating units of the present invention.

An individual gas generating unit 26 is shown in FIG. 3, and comprises a primary combustion chamber or zone 30, a secondary reaction chamber or zone 32, and a cooling and vaporizing chamber or zone 34. As shown herein, the housing portion for the coolant vaporizing chamber 34 comprises a cylindrical sidewall 35, a flat circular burst disc 36 at its downstream or discharge end, and a base plate 38 which as shown herein is integral with the sidewall 35. The burst disc 36 is mounted to the sidewall 35 by means of a ring 40 with an annular groove 42 formed at the discharge end of the sidewall 35.

The secondary reaction chamber 32 is defined by the base plate 38 and an adjacent retaining screen 44, a cylindrical sidewall 46 and an upstream retaining screen 48. For ease of manufacture, the sidewall 46 is made integral with a mounting plate 50 by which the several units 26 are interconnected in a cluster and attached to the mounting structure 22 on the steering column 12. The primary combustion chamber 30 is defined by the screen 48 and a hemispherical base 52 made integral with the sidewall 46.

In the primary combustion chamber 30 there is positioned a charge of a primary combustion or gas generating composition (described in more detail hereinafter) in th form of pellets 54. At the lower end of the primary composition charge 54 is an igniter 56 having a pair of leads 58 which in turn are attached to a suitable voltage source for causing ignition of the gas generating composition 54. The firing of the igniter is caused by a suitable crash sensor, such as an inertial switch.

In the secondary reaction chamber is a charge of a secondary reaction composition 62, which is in the form of small pellets or other form to permit the passage of gases therethrough. At both the upstream and downstream face of the composition 62 is a layer of steel wool 64 and 66, respectively, which acts not only as a composition retainer, but also as a mechanical filter.

At the center of the plate 38 which separates teh secondary reaction chamber 32 from the coolant and vaporizing chamber 34, there is an exhaust nozzle 68 leading from the chamber 32 into the cooling and vaporizing chamber 32. This nozzle 68 is closed by a burst disc 70. In the cooling and vaporizing chamber 34 is a quantity of a vaporizable liquid, such as a liquid halocarbon (e.g. Freon).

To describe the operation of this apparatus, in a crash situation an activating switch sends electric energy to each of the igniters 56 in the several units 26. Each igniter 56 causes its gas producing pellets 56 to burn so as to provide a sustained production of combustion gases for a short duration (e.g. 20 to 30 milliseconds). As will be disclosed hereinafter, the gases produced by the composition 54 comprise free nitrogen and other combustion products. These gases pass through the separating screen 48 and steel wool filter 64 into the secondary reacting chamber 32 which reacts out from the gas mixture the undesirable combustion products, (as described hereinafter), while permtting the free nitrogen to pass therethrough. The burst disc 70 ruptures because of the gas pressure and the nitrogen gas passes through the discharge nozzle 68 into the cooling and vaporizing chamber 34.

The precise manner in which the nitrogen gas first atomizes and then vaporizes the liquid coolant in the chamber 34 is described more fully in the concurrently filed continuation-in-part application based on the aforementioned pending U.S. patent application Ser. No. 84,267. In general, in the first millisecond or so the nitrogen gas passes into the coolant chamber 32, causing most of the liquid coolant to atomize into droplets and rupture the burst disc 36, whereupon the coolant droplets begin to move into interior of the collapsed bag 20. After a few milliseconds the stream of gases from the nozzle 68 forms a central flow path through the atomized droplets of coolant and entrains the atomized droplets into that stream to provide a relatively cool gas mixture which inflates the bag 20 on a controlled basis.

It is to be understood that the arrangement of the primary combustion chamber 30, secondary reaction chamber 32 and cooling and vaporizing chamber 34 can be modified. For example, these chambers could be arranged in an annular configuration or could be arranged to discharge radially inwardly or outwardly. Also the manner of directing the inflating gases can be modified, as by passing such gases through an aspirating device or other inflating apparatus to add ambient air thereto. Other such modifications will be evident to those skilled in the art.

B. Primary Gas Generating Composition

In general, the primary gas producing composition 54 of the present invention comprises a nitrogen producing ingredient and a second ingredient reactant therewith upon excitation, which second ingredient is desirably an oxidizing ingredient. The nitrogen producing ingredient disclosed herein is an azide, such as an alkali metal azide, or alkaline earth metal azide, or mixtures therof. The preferred azide is sodium azide.

The oxidizer to be combined with the azide can be a metal perchlorate (e.g. potassium perchlorate), a metal chlorate (e.g. potassium chlorate), a chlorocarbon (e.g. $C_6Cl_6$), a metal chloride (e.g. calcium chloride or magnesium chloride), and certain metal peroxides and superoxides (e.g. potassium peroxide, potassium superoxide, sodium peroxide, etc.) or mixtures thereof. However, it is desirable not to combine oxidizers having both carbon and oxygen, because of the possibility of producing carbon monoxide. Possibly inorganic nitrates such as $NH_4NO_3$, $KNO_3$ or $Mg(NO_3)_2$ could be used, but are less likely candidates because of the tendency to produce nitrogen oxide. The preferred oxidizer is potassium perchlorate, although $C_6Cl_6$, calcium chloride and potassium chlorate have also been used satisfactorily as oxidizers in the present system. Also, small amounts of powdered metal, such as powdered aluminum, can be added to react with a small part of the nitrogen and add heat to the reaction, but in general the reaction of the metal with the nitrogen in the absence of an oxidizer is too slow to be effective in the present crash restraint system.

The characteristics of the present primary gas producing composition are next described with reference to sodium azide as the nitrogen producing ingredient, and potassium perchlorate as the oxidizer, it being understood that the following description is not limited to those specific ingredients. The stoichiometric reaction of sodium azide and potassium perchlorate is as follows:

$$KClO_4 + 8NaN_3 \rightarrow KCl + 4Na_2O + 12N_2$$

The stoichiometric balance of these two ingredients occurs by use of 21.03 percent potassium perchlorate and 78.97 percent sodium azide by weight. When the proportion is oxidizer rich (i.e. excess potassium perchlorate), a certain amount of free oxygen is also generated as one of the combustion products. On the other hand, when the composition is sodium azide rich, a certain amount of metallic sodium in vapor or liquid form is produced, with additional free nitrogen.

Figure 4:
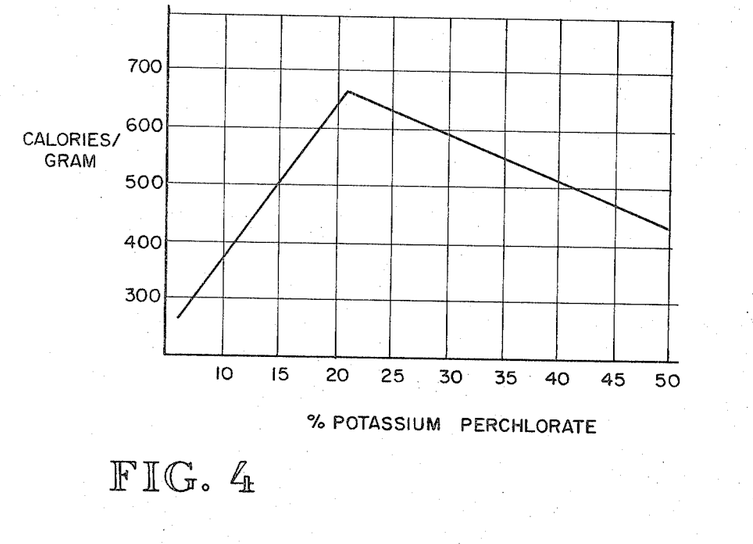
FIG. 4 is a graph illustrating the heat generated by varying the relative quantities of sodium azide and potassium perchlorate in the primary combustion composition.
Figure 5:
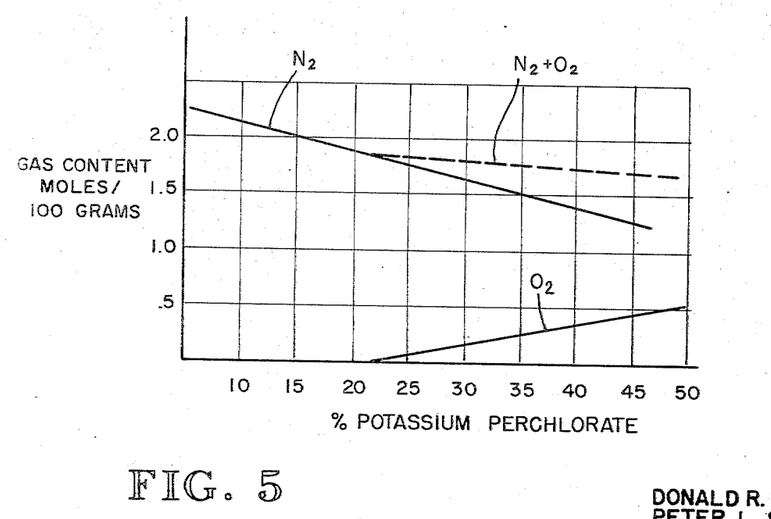
FIG. 5 is a graph similar to FIG. 4, showing the amount of gas generated by varying the component percentages in this composition.

The gas producing characteristics of this composition can be illustrated more clearly with reference to the graphs of FIGS. 4 and 5. It can be seen in FIG. 4 that the maximum calories per gram of composition are attained when the proportioning of ingredients is stoichiometric. However, when the composition begins to become sodium azide rich (i.e. more than 78.97 percent sodium azide) the heat generated by the composition sharply decreases. For example, with 90 percent sodium azide, heat generated is almost half that generated by using the stoichiometric balance.

The graph of FIG. 5 illustrates the gas generated by the composition in terms of moles of gas per 100 grams of composition. As the percentage of sodium azide increases beyond the stoichiometric percentage, the moles of gas generated per unit of composition becomes somewhat greater. As the percentage of sodium azide decreases below the stoichiometric proportion, the resulting combustion gases contain more free oxygen. This is somewhat undesirable, since there is a possibility for the oxygen to react with the nitrogen for form nitrogen oxides which can be harmful to humans when inhaled. However, compositions containing as much and even more potassium perchlorate by weight than sodium axide have been fired, with only small amounts of oxides of nitrogen being formed.

In general, though, making the composition sodium azide rich behond the point of stoichiometry of advantageous, since less heat is generated, and more nitrogen gas is released. Further, there is less sodium oxide generated (which is an undesirable combustion product) and less potassium chloride generated. There is more free sodium (rather than sodium oxide), bu the free sodium is easier to subsequently react out than the sodium oxide.

It has been thus determined that according to the present invention, the composition range of the ratio of potassium perchlorate to sodium azide should be between about 1 to 20 and 2 to 1, by weight. When the percentage of sodium azide is greater than the approximate 1 to 20 range, there is difficulty in producing enough heat to drive the reaction to inflate the bag quickly enough. At the other extreme, with too much oxidizer, there is the possibility of forming nitric oxide. The preferred range of these constituents is between about 1:10 and 1:1, by weight. Ninety percent sodium azide and 10 percent potassium perchlorate has been found to provide a very satisfactory primary gas producing composition.

In some instances it is desirable to add a sustaining heat source in the primary composition to provide steady burning. Such a heat source is characterized by not generating any large amount of gaseous combustion products, and burning at a substantially uniform rate regardless of pressure variations in the combustion chamber. A suitable such heat sustainer is pellets made of 18 percent boron and 82 percent potassium nitrate by weight in pellets of about 0.03 gram. Such pellets are indicated at 72 in FIG. 3.

C. Secondary Reaction Composition

The function of the secondary reaction chamber and composition therein is to permit the nitrogen gas to pass into the cooling and vaporizing chamber, while reacting with the undesirable constituents fo the gas mixture so as to remove them from the gas mixture. The precise ingredients of the secondary reaction composition is to depend, of course, on the nature of the primary combustion chamber composition. In general, the combustion products from the primary chamber to be reacted in the secondary chamber are a metal oxide derived from the azide and some free metal from the azide if the combustion compostion is azide rich. The secondary reaction composition will be described with reference to the preferred primary combustion composition (e.g. sodium azide and potassium perchlorate), although it is not intended that it be limited thereto.

As indicated above, if there is a stoichiometric balance between the sodium azide and potassium perchlorate, the main combustion products are nitrogen, sodium oxide and potassium perchlorate. The sodium oxide is undesirable in two respects. First, it reacts with the Freon in the cooling chamber in the following manner:

$$2Na_2O + C_2Cl_2F_4 \rightarrow CO(Cl \text{ or } F)_2 + CO + 4Na(Cl \text{ or } F)$$

As indicated previously herein, the presence of phosgene ($COCl_2$) or fluorophosgene ($COF_2$) and carbon monoxide are both undesirable. Secondly, sodium oxide itself is harmful to human beings when inhaled and therefore should not be present in the crash restraint bag.

If the primary combustion chamber composition is azide rich, there will also be free sodium generated as one of the combustion products. The sodium will attack the Freon to decompose it and cause harmful combustion products, and of course free sodium in the crash restraint bag can be harmful if inhaled by humans.

Thus, regardless of the proportioning to the potassium perchlorate and sodium azide, the composition for the secondary reaction chamber should contain an ingredient or ingredients to react with the metal oxide (i.e. $Na_2O$). It has been found that an acidic oxide, such as silicon oxide, boric oxide, cupric oxide, or aluminum oxide, are suitable for this purpose.

When silicon oxide is used, it is in the form of silica gel, sand or crushed glass. Sodium oxide reacts with the silicon dioxide in the following manner.

$$Na_2O + SiO_2 \rightarrow Na_2SiO_3 \text{ (Sodium metasilicate)}$$

This equation is a much simplified version of the actual chemical reactions taking place, since silica gel is not simply $SiO_2$, but also contains hydroxyl groups, water and other impurities. Sodium oxide and silica can also combine in other ratios forming other less well-defined silicates.

Since sodium metasilicate ($Na_2SiO_3$) has a lower melting point (1362°K) than silicon dioxide, the formation of $Na_2SiO_3$ can result in a molten layer on the silica gel surface. The glazed appearance of the silica gel observed in some experiments wherein silica was used as the main component of the secondary reaction composition is believed due to molten $Na_2SiO_3$. It is believed that this molten surface may aid in removing non-reactive particles by trapping them in the sticky surface layers.

It is also believed that a substantial part of the sodium condenses on the colder areas of the silica gel and that a major fraction of this is removed by reaction with the silica gel. This reaction is considered to consist primarily of the reaction between sodium and the hydroxyl groups and water attached to the very porous surface of the silica gel as shown in the following equations:

$$2Na + H_2O \rightarrow Na_2O + H_2$$

$$Na + (-Si-OH) \rightarrow -Si-O-Na + \tfrac{1}{2}H_2$$

Proof that these reactions take place has been demonstrated by the presence of hydrogen in the exhaust products. Sodium oxide produced in the reaction would be solid or partially liquid, depending on the combustion chamber temperature of the propellant. It is theorized that the sodium oxide created at this temperature reacts rapidly with the silica gel according to the equation above showing this reaction forming sodium metasilicate. When boric oxide ($B_2O_3$) is used, it is in the form of beads, irregular shaped granules or deposited on a carrier substrate such as aluminum oxide or crushed brick.

The metal oxide (i.e. $Na_2O$) dissolves in, and reacts with, boric oxide over a wide range of compositions. The mole percent of $Na_2O$ in $B_2O_3$ may vary from zero up to 50 percent or more.

When one mole of $Na_2O$ combines with two moles of $B_2O_3$, the result is sodium tetraborate as shown below.

$$Na_2O + 2B_2O_3 \rightarrow Na_2B_4O_7$$

When the reaction involves one mole of $Na_2O$ and one mole of $B_2O_3$ the result is sodium metaborate.

$$Na_2O + B_2O_3 \rightarrow 2NaBO_2$$

In actual practice there is no well defined ratio of sodium oxide to boric oxide and the result is a borate glass.

The fact that metal oxides dissolve in boric oxide and silicon dioxide in various ratios is theorized to be a definite advantage in the present invention since a surface layer would not prevent further reaction but would simply diffuse into the particle.

While the results are not as clearly evident, it is also theorized that boric acid ($H_3BO_3$) would behave similarly to $B_2O_3$, which is the anhydride of boric acid.

It has also been discovered that a convenient form for use of the boric oxide is when dispersed on a solid substrate and sintered to form a solid, porous mass. When used in this form the powdered $B_2O_3$ is mixed with the solid substrate which can be aluminum oxide, crushed brick or other material which does not melt at the temperatures used for sintering, and the mixture is heated to approximately 400° to 800°C. The hot mixture is then placed in a mold and packed by hand or compressed to a higher density by a hydraulic press. Alternatively, the hot mixture may be cooled, then crushed and placed in a mold which is then heated to 400° to 800°C. This system results in a very strong, monolithic structure which offers advantages in vibration, assembly and structural strength areas.

With respect to using cupric oxide in the secondary reaction composition, cupric oxide (CuO) reacts with sodium oxide in the following manner:

$$Na_2O + CuO \rightarrow Na_2CuO_2$$

In the experiments performed, copper oxide was used in a wire form but could be used in other forms, such as deposited on a carrier substrate. After firings, the copper oxide would be partially or completely converted to metallic copper and sodium cuprite by, respectively, metallic sodium and sodium oxide. The reaction of the cupric oxide and metallic sodium is as follows:

$$2Na + CuO \rightarrow Cu + Na_2O$$

When alumina ($Al_2O_3$) is used as an ingredient in the secondary reaction composition, it is desirably in the form of a bet of activated alumina. Alumina is believed to be quite effective as a chemical filter for sodium oxide, and less so for metallic sodium, although sodium does react with the alumina at elevated temperatures. In the experiments conducted evidence of considerably chemical interaction of sodium oxide with the alumina was observed by extracting the filter bed with water. The aqueous solution was then acidified, causing precipitation of aluminum hydroxide which had been converted to a soluble aluminate by reaction with sodium oxide. The reactions are:

$$3Na_2O + Al_2O_3 \rightarrow 2Na_3AlO_3$$

or $$Na_2O + Al_2O_3 \rightarrow 2NaAlO_2$$
$$Na_3AlO_3 \xrightarrow{H_2O} 3Na^+ + AlO_3^{-3}$$
$$AlO_3^{-3} + 3H^+ \rightarrow Al(OH)_3$$
$$NaAlO_2 \xrightarrow{H_2O} Na^+ + AlO_2^- (\text{or } H_2AlO_3^-)$$
$$AlO_2^- + H^+ + \xrightarrow{H_2O} Al(OH)_3$$

In addition to utilizing an acidic oxide in the secondary reaction composition as indicated above, it has been found that the addition of activated charcoal is very effective for reacting with the metallic sodium at high temperatures to form sodium carbide. Thus, when the composition of the primary combustion chamber is azide rich (i.e. a greater percentage of sodium azide than with stoichiometric proportioning) it is highly desirable to add carbon in the form of activated charcoal to the secondary reaction chamber composition. The carbon and the acidic oxide can be mixed together or can be used in separate layers in the secondary reaction chamber.

D. Vaporization and Cooling Composition

The function of the cooling and vaporizing composition in the chamber 34 is as its name implies to receive the gaseous discharge from the secondary combustion chamber and:

a. cool this gaseous discharge, and
b. vaporize to add yet more gas to form a gaseous mixture of increased volume. In this could encompass a great number of compositions that vaporize or sublime to form a gas. However, as indicated earlier herein, to function in a "man-rated" crash restraint system, the gas formed from this composition must be able to be inhaled by human beings, be non-flammable, non-scalding, and otherwise non-damaging to human beings exposed thereto in an emergency situation.

Liquid halocarbons have been found to be very desirable candidates for the cooling and vaporizing compositions. It has been found specifically, that perfluorocyclobutane and perfluorodimethylcyclobutane work particularly well. As indicated earlier herein, it is critical that the gaseous discharge from the secondary reaction chamber does not contain products (e.g. sodium or sodium oxide) that decompose the halocarbon to form phosgene and/or carbon monoxide. It is beneficial in some instances to add a mild acid (e.g. 2-ethylhexanoic acid) to the coolant to react out any undesired products (e.g. free sodium) which may pass through the secondary chamber. Also the gaseous discharge into the halocarbon in the chamber should not be excessively hot (e.g. 2,000°F.), otherwise, decomposition of the halocarbon can occur. In this regard, the secondary reaction composition has a cooling effect on the gases from the primary combustion chamber.

However, it is to be understood that any compositions compatible (as indicated above) with the requirements of a man-rated crash restraint system are to be considered acceptable. Further, it is to be understood that while the vaporizing function is desirable and is considered to be part of the present invention, within the broader aspects of the present invention it is not an absolutely necessary function, and means which perform a cooling function without adding additional gas to the discharge products from the secondary reaction chamber can also be used. For example, a material of high heat conductivity can be used to absorb heat from the gaseous discharge of the secondary reaction chamber but not of itself contribute discharge gas.

Further, it is also realized that, within the broader aspects of the present invention, it is not necessary in some applications thereof to cool the gases from the secondary reaction chamber. This is the case, for example, where the reaction in the secondary reaction chamber, along with the heat absorptive characteristics of the composition in the secondary reaction chamber, are such that the gaseous discharge from the secondary reaction chamber is already at a sufficiently low temperature or the application is such that a higher discharge gas temperature can be tolerated.

EXAMPLE 1

To prepare the primary reaction composition, a mixture of potassium perchlorate and sodium azide was made in the following manner. Reagent grade (99.5 percent minimum $KClO_4$) potassium perchlorate, with a particlar size of about 10 microns was used in order to obtain the desired burning rate. This particle size was obtained by processing the potassium perchlorate in a Mikro-Pulverizer, using two passes at 12,100 rpm. The pulverized potassium perchlorate was kept dry; and just prior to use it was dried at 110°C. for 2 hours.

The sodium azide used was J. T. Baker — "practical" grade. To obtain the desired burning rate, the azide was ground in a mortar to a fine powder such that all passed through a Tyler No. 24 screen and over 85 percent passed through a Tyler No. 60 screen. Sodium azide, 99 percent minimum purity, 0.05 to 0.4 mm mesh size was used in later tests after sieving through a Tyler No. 35 screen to remove lumps. It was found that the screened sodium azide could be substituted directly for the ground Baker sodium azide without significantly altering the ballistics.

The pulverized potassium perchlorate and sodium azide were hand blended by hand stirring for 5 to 10 minutes. (In other examples, a combination of stirring and shaking the powders in closed containers was used to blend the mixture.) By continuous, careful mixing, a uniform dry granular material was obtained which could be pressed into pellets. The mixture was 90 percent sodium azide by weight and 10 percent potassium perchlorate.

The pellets were pressed in a 0.45 inch diameter cylindrical die at 5,000 pounds force. Both a Carver press and a Stokes Model F single punch tablet press were used. In this experiment the weight of each single pellet was approximately 0.2 gram; its diameter 0.45 inch; its thickness was 0.040 inch. Twelve of these pellets weighing 2.51 grams total were placed in the bottom of the housing (containing structure) of a single gas generating unit, such as that shown in FIG. 3 herein. Also, nine pellets of a boron potassium nitrate mixture, 18 percent boron and 82 percent potassium nitrate, (2R-1P-60 type pellets made by the Flare Northern Department Atlantic Research Corporation of Sangus, California), each of which pellets weighted about 0.033 gram, were placed in among the 12 pellets of the primary combustion composition. The housing structure of the gas generating unit was 1.4 unches wide and 3.5 inches long.

To ignite this mixture a standard commercial igniter (Atlas match), and 0.7 gram of IP-60, a boron/potassium nitrate powder (82 percent potassium nitrate and 18 percent boron) in an aluminum foil pouch placed around the match head was inserted in the bottom of the unit.

A steel screen was placed over this composition, and a layer of 0.2 grams of steel wool was placed over the screen. Then 6.0 grams of silica gel (5 to 10 mesh) were placed on top of the steel wool. A second layer of 0.2 grams of steel wool was then placed on top of the silica gel and covered by a steel screen. Then a plate and burst disc were placed over the last screen, as shown in FIG. 3 herein. Twenty-four grams of Freon (F-C318), which is $C_4F_8$, was placed in the chamber above the plate with the burst disc, and this in turn was closed with a burst diaphragm, as shown in FIG. 3 herein.

An electric current was passed through the igniter to cause ignition. The primary composition burned for about 25 milliseconds, discharging its gases through the secondary reaction chamber, which in turn passed its discharge gases through the cooling and vaporizing chamber to form a gaseous mixture, which was discharged into a vacuum tank of 0.10 cubic feet volume. Analysis of the gas resulting from this firing showed that there was very little decomposition of the Freon and no phosgene was formed.

After firing the silica gel had the appearance of being sintered together. The surfaces of the individual particles were glazed by reaction with sodium oxide and formation of sodium silicate. Evidence of extensive chemical interaction between the sodium and sodium oxide and the secondary reaction material was demonstrated by two factors. The appearance of several percent by volume of hydrogen in the exhaust was the result of sodium reacting with water and hydroxyl groups held on the surface of the filter material. In addition, extensive conversion of the silica gel to soluble sodium silicate was demonstrated by determining the residual weight after extraction with water.

EXAMPLE 2

The same procedure was followed as in Example 1, but with 23 grams of Freon in the varporizing and cooling chamber and with 21 pellets of the primary composition (i.e. 4.08 grams). Substantially the same results were obtained as in Example 1.

EXAMPLE 3

The same procedure was followed as in Example 2 but with 33 grams of Freon. Satisfactory results were likewise obtained.

EXAMPLE 4

For purposes of comparison, the same procedure was followed as in Example 3, but the secondary reaction chamber was left empty, so that the combustion products from the primary combustion chamber passed directly into the Freon in the varporizing and coolant chamber. There was considerable decomposition of the Freon, and 36 ppm phosgene were found in the decomposition products.

EXAMPLE 5

The same procedure was followed as in Example 1, except that the silica gel was 12 to 20 mesh. Satisfactory results were likewise obtained.

EXAMPLE 6

The same procedure was followed as in Example 1, except that in place of the silica gel in the secondary reaction chamber, 9.0 grams of activated alumina ($Al_2O_3$) was used, and Freon C318 ($C_rF_8$) was used. The same satisfactory results were obtained. Evidence of considerable chemical interaction of sodium oxide with the alumina was observed by extracting the filter bed with water. The aqueous solution was then acidified, causing precipitation of aluminum hydroxide which had been converted to a soluble aluminate by reaction with sodium oxide.

EXAMPLE 7

The same procedure was followed as in Example 6. Satisfactory results were obtained.

EXAMPLE 8

The procedure was followed as in Example 1, except the primary composition was 79 percent sodium azide and 21 percent potassium perchlorate. Thirteen of these pellets were used, the total weight of the primary composition used being 5.2 grams. No heat sustaining pellets were used. Silica gel (12–20 mesh) was used in the secondary reaction chamber. Satisfactory results were obtained substantially the same as in the prior examples.

EXAMPLE 9

The same procedure was followed as in Example 8, but with 24 grams of Freon (F-318) and 17 pellets (6.8 grams) of the primary composition. Satisfactory results were likewise obtained.

EXAMPLE 10

The same procedure was followed as in Example 9, except that the primary reaction composition was 75 percent sodium azide and 25 percent potassium perchlorate. Ten pellets (4.8 grams) were used. Twenty grams of Freon (F-C318) were used. Satisfactory results were also obtained.

EXAMPLE 11

The same procedure was followed as in Example 10, except that in formulating the primary reaction composition, only 40 percent sodium azide was used and 60 percent potassium perchlorate. There was very little decomposition of the Freon. No phosgene was formed. A small amount of nitric oxide was formed.

EXAMPLE 12

The same procedure was followed as in Example 1, except that in the secondary reaction chamber, 6 grams of activated alumina coated with 20 percent by weight $H_3BO_3$, with an 0.5 inch layer of cupric oxide (CuO) in wire form was used. Thirty-three pellets (6.6 grams) of the primary composition was used. No heat sustainer was used. There were 20 grams of Freon (F-C318) in the vaporizing and cooling chamber. After the firing it was noted that there was no decomposition of the Freon; a very clean gas was generated. There was no phosgene. The copper oxide was partially converted to metallic copper and sodium cuprite.

EXAMPLE 13

The same procedure was followed as in Example 12, except that for the secondary reaction composition, 8.0 grams of activated alumina was used with 0.6 inch layer of cuprite oxide (CuO) in wire form. Also 52 pellets (10.4 grams) of primary composition was used. The same results were obtained as in Example 12.

EXAMPLE 14

The same procedure was followed as in Example 13, but with 33 pellets of primary reaction composition, weighing 6.6 grams. In the secondary reaction chamber, there was 6.0 grams of activated alumina, and a 0.5 inch layer of activated charcoal. There was minor decomposition of the Freon. No phosgene was formed.

EXAMPLE 15

Substantially the same procedure was followed as in Example 8, except that there was no Freon in the cooling and vaporizing chamber. Nine pellets of primary composition weighing about 3.6 grams were used. A clean gas, primarily nitrogen, was produced.

What is claimed is:

1. In an occupant carrying vehicle having an occupant carrying location and structure spaced from the location, a crash restraint system for protecting an occupant in said location from impact with said structure said system comprising:
    a. a collapsed inflatable so disposed and mounted in said vehicle that upon being inflated the inflatable is positioned between said structure and said occupant carrying location,
    b. at least one gas generating unit to supply inflating gas to said inflatable, said unit comprising:
        1. a first structure defining a primary combustion zone and arranged to discharge gaseous products along a predetermined downstream path;
        2. a second structure defining a secondary reaction zone downstream of said primary reaction zone and arranged to receive a gaseous discharge therefrom;
        3. a third structure defining a coolant zone located downstream of said first and second structures and arranged to receive gaseous discharge from said secondary reaction zone;
        4. said third structure having an outlet leading into said inflatable to direct gaseous discharge therefrom into said inflatable;
        5. a primary gas producing composition located in said primary reaction zone, which composition reacts to form free nitrogen and at least one other combustion product, said composition comprising an azide and an oxidizer to react with said azide, said azide being selected from a group consisting of alkali metal azides, alakline earth metal azides, and mixtures thereof;
        6. a secondary composition located in said secondary reaction zone and arranged to permit passage therethrough of nitrogen and to remove at least a substantial portion of said other combustion product, said secondary composition being at least partly made up of an acidic oxide, and
        7. a coolant material in said coolant zone to cool gaseous discharge from said secondary reaction zone.

2. The system as recited in claim 1, comprising carbon in said secondary reaction chamber.

3. The system as recited in claim 1, wherein at least a portion of said secondary reaction composition is selected from a group consisting of silicon oxide, aluminium oxide, boric oxide, boric acid, cupric oxide and mixtures thereof.

4. The system as recited in claim 1, wherein said secondary reaction composition comprises silicon oxide.

5. The system as recited in claim 1, wherein said secondary reaction composition comprises cupric oxide.

6. The system as recited in claim 1, wherein said secondary reaction composition comprises aluminum oxide.

7. The system as recited in claim 1, wherein said secondary reaction composition comprises boric oxide.

8. The system as recited in claim 1, wherein said secondary reaction composition comprises boric acid.

9. The system as recited in claim 1, wherein said oxidizer is selected from a group consisting of metal perchlorates, metal chlorates, metal peroxides, metal superoxides, chlorocarbons, metal chlorides, and mixtures thereof.

10. The system as recited in claim 9, wherein said azide is contained in the primary reaction composition in a percentage greater than the stoichiometric proportion of the azide to the oxidizer.

11. The system as recited in claim 10, comprising charcoal in said secondary reaction chamber.

12. The system as recited in claim 10, wherein said azide is essentially sodium azide.

13. The system as recited in claim 12, wherein said oxidizer is essentially a metal perchlorate.

14. The system as recited in claim 13, wherein said oxidizer is essentially potassium perchlorate.

15. In an occupant carrying vehicle having an occupant carrying location and structure spaced from said location, a crash restraint inflating system adapted to inflate a collapsed inflatable and so disposed and mounted in said vehicle that upon being inflated the inflatable is positioned between said structure and said occupant carrying location to protect an occupant in said location from impact with said structure, said system comprising:
    a. a first structure defining a primary combustion zone and arranged to discharge gaseous products along a predetermined downstream path;
    b. a second structure defining a secondary reaction zone downstream of said primary reaction zone and arranged to receive a gaseous discharge therefrom and provide a gaseous discharge from said second structure to inflate the inflatable;
    c. a primary gas producing composition located in said primary reaction chamber and comprising a nitrogen containing ingredient which is an azide selected from a group consisting of alkali metal azides, alkaline earth metal azides and mixtures thereof, and a second ingredient which is an oxidizer, that reacts with the nitrogen containing ingredient to form free nitrogen and at least one other combustion product; and
    d. a secondary composition located in said secondary reaction chamber and arranged to permit passage therethrough of the free nitrogen and to remove at least a substantial portion of said outer combustion product, said secondary composition being at least partly made up of an acidic oxide.

16. The system as recited in claim 15, comprising carbon in said secondary reaction chamber.

17. The system as recited in claim 15, wherein at least a portion of said secondary reaction composition is selected from a group conisting of silicon oxide, aluminum oxide, boric oxide, boric acid, cupric oxide and mixtures thereof.

18. The system as recited in claim 15, wherein said secondary reaction composition comprises silicon oxide.

19. The system as recited in claim 15, wherein said secondary reaction composition comprises cupric oxide.

20. The system as recited in claim 15, wherein said secondary reaction composition comprises aluminum oxide.

21. The system as recited in claim 15, wherein said secondary reaction composition comprises boric oxide.

22. The system as recited in claim 15, wherein said secondary reaction composition comprises boric acid.

23. The system as recited in claim 15, wherein said oxidizer is selected from a group consisting of metal perchlorates, metal chlorates, metal peroxides, metal superoxides, chlorocarbons, metal chlorides, and mixtures thereof.

24. The system as recited in claim 23, wherein said azide is contained in the primary reaction composition in a percentage greater than the stoichiometric proportion of the azide to the oxidizer.

25. The system as recited in claim 24, comprising charcoal in said secondary reaction chamber.

26. The system as recited in claim 24, wherein said azide is essentially sodium azide.

27. The system as recited in claim 26, wherein said oxidizer is essentially a metal perchlorate.

28. The system as recited in claim 27, wherein said oxidizer is essentially potassium perchlorate.

29. In an occupant carrying vehicle having an occupant carrying location and structure spaced from said location, a method of inflating a crash restraint inflatable for protecting an occupant in said location from impact with sais structure, said method comprising:
   a. producing a primary reaction gas by reacting in a primary reaction chamber a primary gas producing composition comprising a nitrogen producing ingredient which is an azide selected from a group consisting of alkali metal azides, alkaline earth metal aizdes and mixtures thereof, and a second ingredient to react therewith, which second ingredient is an oxidizer, to produce a gas mixture comprising free nitrogen and at least one other combustion product;
   b. directing said gas mixture through a secondary composition in a secondary reaction chamber, which secondary composition is at least partly made up of an acidic oxide to remove at least a substantial portion of said other combustion product and permit said free nitrogen to pass therethrough so as to emit a gaseous discharge; and
   c. directing said gaseous discharge into said inflatable.

30. The method as recited in claim 29, wherein there is carbon in the secondary reaction chamber.

31. The system as recited in claim 29, wherein at least a portion of said secondary reaction composition is selected from a group consisting of silicon oxide, aluminum oxide, boric oxide, boric acid, cupric oxide and mixtures thereof.

32. The system as recited in claim 29, wherein said secondary reaction composition comprises silicon oxide.

33. The system as recited in claim 29, wherein said secondary reaction composition comprises cupric oxide.

34. The system as recited in claim 29, wherein said secondary reaction composition comprises aluminum oxide.

35. The system as recited in claim 29, wherein said secondary reaction composition comprises boric oxide.

36. The system as recited in claim 29, wherein said secondary reaction composition comprises boric acid.

37. The system as recited in claim 29, wherein said oxidizer is selected from a group consisting of metal perchlorates, metal chlorates, metal peroxides, metal superoxides, chlorocarbons, metal chlorides, and mixtures thereof.

38. The system as recited in claim 37, wherein said azide is contained in the primary reaction composition in a percentage greater than the stoichiometric proportion of the azide to the oxidizer.

39. The system as recited in claim 38, comprising charcoal in said secondary reaction chamber.

40. The system as recited in claim 38, wherein said azide is essentially sodium azide.

41. The system as recited in claim 40, wherein said oxidizer is essentially a metal perchlorate.

42. The system as recited in claim 41, wherein said oxidizer is essentially potassium perchlorate.

* * * * *